Patented May 16, 1939

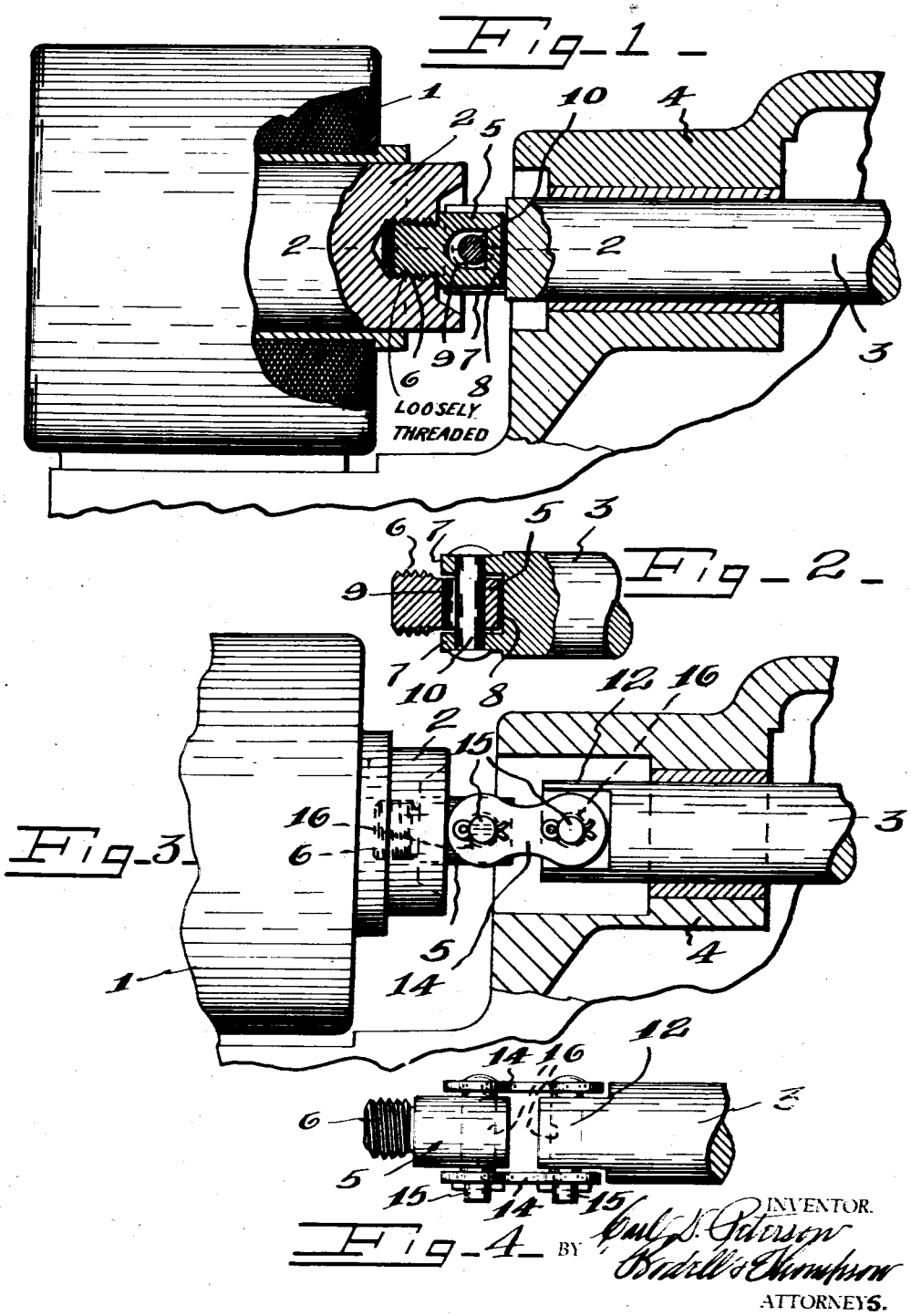

2,158,480

UNITED STATES PATENT OFFICE 2,158,480

SOLENOID OPERATING SHIFTING MECHANISM

Carl D. Peterson, Toledo, Ohio, assignor to Spicer Manufacturing Corporation, Toledo, Ohio, a corporation of Virginia Application May 22, 1936, Serial No. 81,320

2 Claims. (Cl. 175—341)

This invention relates to a solenoid operated shifting mechanism, and particularly to a connection between the core of the solenoid and the part to be shifted thereby, as, in a transmission gear, such as is used in motor vehicles, a shift rod or a rod used to shift a selecting and gear shifting lever, which connection relieves the solenoid, particularly when the solenoid is in horizontal position, from strains, due to misalinements of the core and the shiftable part, so that the core when acted upon by the magnetic flux is not hindered or modified in its movement.

It is well known that the cores of solenoids move parallel to the axis of the magnetic field and that any force tending to move them out of alinement with the passage in the field of the solenoid in which the core slides, creates a retarding effect or increases the sliding friction, oftentimes to the extent that the solenoid fails to function or work efficiently.

The invention therefore has for its object a connection in a solenoid operated shifting mechanism between the core of the solenoid and a part to be shifted by the core, which connection includes means by which the core is relieved of strains, due to misalinements of the core and of said part.

The invention consists in the novel features and in the combinations and constructions hereinafter set forth and claimed.

In describing this invention, reference is had to the accompanying drawing in which like characters designate corresponding parts in all the views.

Figure 1 is a sectional view, partly in elevation, of one embodiment of my invention.

Figure 2 is a sectional view of the connection taken on the plane of line 2—2, Figure 1.

Figure 3 is a view similar to Figure 1 of a slightly different form of the connection between the core of the solenoid and the shiftable part.

Figure 4 is a plan view of the connection shown in Figure 3.

1 designates the field or windings of a solenoid and 2 the sliding core. 3 designates a part to be shifted, which is here shown as a rod slidably mounted in a passage in the cover 4 of the gear box of a transmission gearing. The part 3 is a rod for shifting the gear selecting and shifting lever in a manner similar to that shown in my pending application Serial Number 55,057, filed December 18, 1935.

In Figure 1, the connection between the core 2 and the shiftable part or rod 3 comprises a head 5 having a shank connected to the core substantially coaxially therewith, by means permitting radial movement of the head and the shank, within limits, in all directions relative to the core, a head connected to the shiftable part and to the former head by a means including a pivotal connection permitting radial movement of the part 3 relatively to the head 5.

As here shown, the head 5 is formed with a shank which is threaded at 6, this threading into an axial passage in the core 2, the threads being of sufficient looseness to permit radial movement in all directions, within limits. 7 is a head provided on the shiftable part or rod 3, this having a recess 8 therein for receiving the head 5. The head 5 is formed with a transverse passage or slot 9 and it is connected to the shiftable part 3 by a pin 10 extending transversely through the recess 8 of the head and the slot 9 in the head 5. The slot 9 permits the part 3 and the head 7 to move radially.

As seen in Figure 3, the head 12, corresponding to the head 7, instead of being formed with a recess and pivoted directly to the head 5, is connected to the head 5 by flexible means, as links 14 pivoted to the heads at opposite ends thereof by pins 15 corresponding to the pin 10 and extending through passages 16 in the heads 5, 12. The heads are mounted on the pins to have side play to compensate for slight misalinements of the core 2 and shiftable part 3. The solenoid and the shiftable part or rod 3 are usually arranged to move in a horizontal direction, and hence when the solenoid is energized by connecting the windings of the solenoid into a closed electric circuit, the core is also moved horizontally. In order to insure the efficient working of the core to operate the shiftable part 3, it is necessary that there be no strains applied to the core tending to move the same off center or out of alinement, and that it be subject to no strains tending to modify the normal air gap between it and the passage of the windings or spool of the solenoid.

By this connection, the movement of the core, when being acted upon by the magnetic flux is not interfered with or modified by the pull of the shiftable part or rod 3, due to the fact that the head 5 is capable of a compensating movement. In either form of my invention, when the windings of the solenoid are cut into a closed circuit, the core of the solenoid is not pulled out of parallelism with the magnetic field or the axis of the solenoid.

What I claim is:

1. In a solenoid operated shifting mechanism, the combination of a solenoid including a sliding core, a part to be shifted by the sliding core, and a connection between the core and said part including a head having a shank threading axially into the core with the threads having looseness sufficient to permit radial movement of the head in all directions, within limits, relatively to the core, said part being formed with a head formed with a recess for receiving the former head, and a pin extending transversely through said heads, and the head, which is connected to the core, having a passage for receiving the pin, the pin loosely fitting the passage, the head connected to the core, loosely fitting the recess of the head of said shiftable part, all whereby the core is relieved during the movement thereof of strains due to misalinements of the core and said part.

2. In a solenoid operated shifting mechanism, the combination of a solenoid including a sliding core, a part to be shifted by the sliding core, and a connection between the core and said part including a head connected to the core coaxially therewith by means permitting radial movement, within limits, of the head relative to the core, said part being formed with a recess for receiving the former head, the former head being formed with a transverse passage and a pin extending transversely through the heads, and the said passage, and loosely fitting the passage, all whereby the core is relieved during the movement thereof of strains due to misalinements of the core and said parts.

CARL D. PETERSON.